United States Patent
Rahn et al.

[11] Patent Number: 5,856,867
[45] Date of Patent: Jan. 5, 1999

[54] METHOD AND APPARATUS FOR DETERMINING THE PRESSURE-INDUCED NONRECIPROCITY OF A FIBER-OPTIC COIL

[75] Inventors: John P. Rahn, West Hills; Ralph A. Patterson, MoorPark, both of Calif.

[73] Assignee: Litton Systems, Inc., Woodland Hills, Calif.

[21] Appl. No.: 901,504

[22] Filed: Jul. 28, 1997

[51] Int. Cl.$^6$ .................................................. G01N 21/00
[52] U.S. Cl. ........................ 356/73.1; 356/73.1; 356/322; 356/364
[58] Field of Search ................................. 356/73.1, 322, 356/364

[56] References Cited

U.S. PATENT DOCUMENTS

| | | | |
|---|---|---|---|
| 4,773,759 | 9/1988 | Bergh et al. | 356/350 |
| 4,896,327 | 1/1990 | Ebberg | 372/32 |

*Primary Examiner*—Robert Kim
*Assistant Examiner*—Reginald A. Ratliff
*Attorney, Agent, or Firm*—Robert E. Malm

[57] ABSTRACT

The invention is a method and apparatus for quantitatively characterizing the pressure-induced nonreciprocity of a fiber-optic coil where the pressure-induced nonreciprocity is a property of a fiber-optic coil which pertains to the degree to which light beams, initially in phase, differ in phase as a result of traversing the fiber-optic coil in reverse directions while the fiber-optic coil is being subjected to a time-varying pressure. The method comprises the steps of applying time-varying pressure to the fiber-optic coil for a predetermined time period, measuring the phase difference of light beams traversing the fiber-optic coil in reverse directions during the predetermined time period, and obtaining a measure of the nonreciprocity of the fiber-optic coil utilizing the measured phase difference. If the time-varying pressure is specified by a first function of time, the measure of the nonreciprocity is the integral over the predetermined time period of the product of a second function of time and either (1) the phase difference of light beams traversing the fiber-optic coil in reverse directions during the predetermined time period or (2) the integral over time of the phase difference. The second function is chosen such that the measure of the nonrecipocity has a signal-to-noise ratio of at least one. Preferably, the second function is (1) an approximation of the time derivative of the first function if the product involves the phase difference or (2) an approximation of the first function if the product involves the integral of the phase difference. The invention also includes the apparatus for practicing the method.

16 Claims, 1 Drawing Sheet

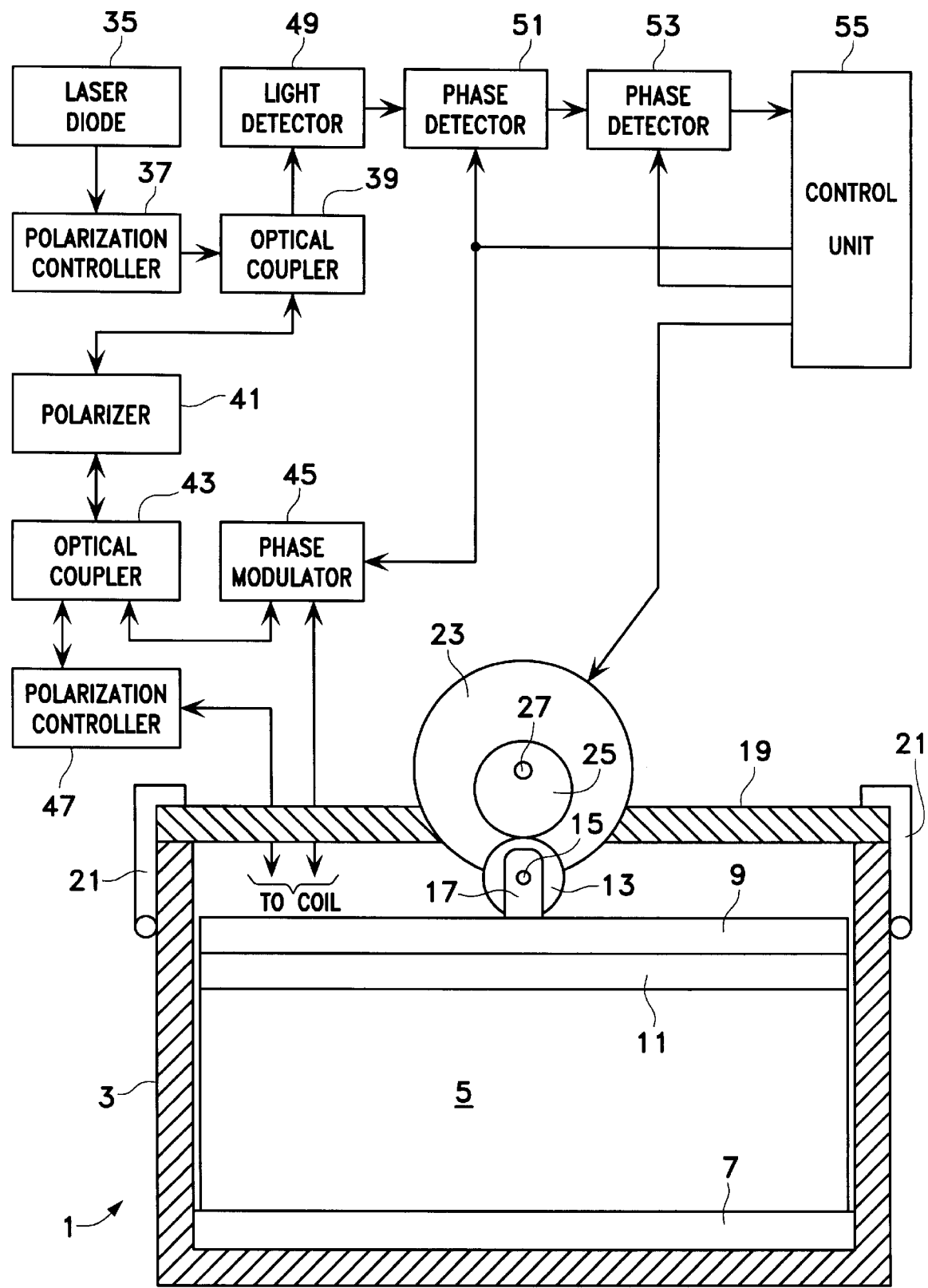

METHOD AND APPARATUS FOR DETERMINING THE PRESSURE-INDUCED NONRECIPROCITY OF A FIBER-OPTIC COIL

BACKGROUND OF INVENTION

This invention relates generally to nonreciprocity of fiber-optic coils used in fiber-optic gyros and more specifically to methods and apparatus for determining pressure-induced nonreciprocity.

It was shown by D. M. Shupe in 1980 (D. M. Shupe, *Thermally Induced Nonreciprocity in the Fiber-Optic Interferometer*, Applied Optics, Vol. 19, No. 5, 1 Mar. 1980, pp. 654–655) that thermally-induced nonreciprocity in fiber-optic ring interferometers can occur if there are time-dependent temperature gradients along the fiber. If corresponding wavefronts of the counter-rotating beams traverse the same region of the fiber at different times, nonreciprocity arises. Shupe showed that this thermally-induced nonreciprocity results in an angular error $\theta_{ET}$ for the fiber-optic gyro given by $$\theta_{ET} = \frac{n_c}{4NA} \left( \frac{dn_c}{dT} + \alpha n_c \right) \int_0^L dl(2l - L)[T(t,l) - T(0,l)] \quad (1)$$

where
where $n_c$ is the refractive index of the fiber core;

N is the number of turns in the fiber—optic coil;

A is the area of the fiber—optic coil;

L is the length of the fiber;

$T(t,l)$ is the temperature of the fiber element at a distance l from the end of the fiber and t is time; and $\alpha$ is the coefficient of linear thermal expansion of the fiber core.

In the case of a multilayer fiber coil wound on a cylindrical form such that the difference between the outside and inside coil diameter is small when compared with its average diameter and assuming that the coil temperature varies linearly from its inner layer to its outer layer, $$\theta_{ET} \cong \frac{n_c L^2 \Delta T}{24 N \alpha} \left( \frac{dn_c}{dT} + n_c \alpha \right) \quad (2)$$

where $$T(t,l) - T(0,l) \equiv (l \Delta T)/L \quad (3)$$

and $\Delta T$ is the change in the temperature difference across the coil from the initialization time 0 of the gyro to some later time t.

Fiber-optic coils are screened prior to assembly into fiber-optic gyros on the basis of measured thermally-induced angular error. The measurement of thermally-induced angular error of a fiber-optic coil is accomplished by applying a temperature ramp to the coil. The temperature ramp process is time-consuming and expensive since stabilization of the temperature depends on rather large coil time constants and reduction of angle random walk noise requires significant integration time. The measurement of thermally-induced angular error typically requires about 24 hours.

There is a need for a screening process which can be accomplished in a time much shorter than 24 hours.

SUMMARY OF THE INVENTION

The invention is a method and apparatus for quantitatively characterizing the pressure-induced nonreciprocity of a fiber-optic coil where the pressure-induced nonreciprocity is a property of a fiber-optic coil which pertains to the degree to which light beams, initially in phase, differ in phase as a result of traversing the fiber-optic coil in reverse directions while the fiber-optic coil is being subjected to a time-varying pressure.

The method comprises the steps of applying time-varying pressure to the fiber-optic coil for a predetermined time period, measuring the phase difference of light beams traversing the fiber-optic coil in reverse directions during the predetermined time period, and obtaining a measure of the nonreciprocity of the fiber-optic coil utilizing the measured phase difference. If the time-varying pressure is specified by a first function of time, the measure of the nonreciprocity is the integral over the predetermined time period of the product of a second function of time and either (1) the phase difference of light beams traversing the fiber-optic coil in reverse directions during the predetermined time period or (2) the integral over time of the phase difference.

The second function is chosen such that the measure of the nonreciprocity has a signal-to-noise ratio of at least one. Preferably, the second function is (1) an approximation of the time derivative of the first function if the product involves the phase difference or (2) an approximation of the first function if the product involves the integral of the phase difference.

The invention also includes the apparatus for practicing the method. The apparatus includes a pressurizing unit wherein time-varying pressure is applied to the fiber-optic coil. The time-varying pressure may arise in a variety of ways, examples being the motion of a mechanical member coupled to the surface of the fiber-optic coil, an electric field applied to a piezoelectric device coupled to the fiber-optic coil, and a magnetic member in a magnetic field where the magnetic member is coupled to the surface of the fiber-optic coil.

BRIEF DESCRIPTION OF THE DRAWINGS

FIG. 1 shows a block diagram of the apparatus used to practice the invention.

DESCRIPTION OF THE PREFERRED EMBODIMENT

The time required for fiber-optic coil screening can be reduced to a few minutes without significantly reducing the quality of the screening by basing the screening process on pressure-induced rather than thermally-induced nonreciprocity. If pressure is applied to the top of the coil along the axial direction, the inner radius of the coil will be reduced and the outer radius will be increased, which is similar to what happens when the temperature of the coil is changed.

The pressure-induced angular error $\theta_{EP}$ resulting from this pressure-induced nonreciprocity is given by $$\theta_{EP} = \quad (4)$$

$$\frac{n_c^2}{4NA} \int_0^L dl(2l-L) \left[ \epsilon_3 \left( 1 - \frac{1}{2} n_c^2 p_{12} \right) - \frac{1}{4} n_c^2 (p_{11} + p_{12})(\epsilon_1 + \epsilon_2) \right]$$

where $\epsilon_1, \epsilon_2$ are the radial strains of the fiber core and are functions of l;

$\epsilon_3$ is the axial strain of the fiber core and is a function of l; and $p_{11}, p_{12}$ are the photoelastic constants of the fiber core.

For glass fibers in the polymer composite of the wound coil, $\epsilon_1 \approx -0.17\epsilon_3$ $\epsilon_2 \approx -0.17\epsilon_3$ $p_{11} = 0.121$ $p_{12} = 0.270$ $n_c = 1.45$ and the above equation can be rewritten as $$\theta_{EP} \approx 0.79 \frac{n_c^2}{4NA} \int_0^L dl(2l-L)\epsilon_3 \quad (5)$$

In the case of a multilayer fiber coil wound on a cylindrical form such that the difference between the outside and inside coil diameter is small when compared with its average diameter and assuming that a uniform pressure is applied to the coil parallel to the coil axis, the axial fiber strain is approximately a cubic function of distance along the fiber:

$$\epsilon_3 = \epsilon_m \frac{(2l-L)^3}{L^3} \quad (6)$$

Substituting the above expression in equation (5) and integrating, we obtain $$\theta_{EP}(t) \approx 0.16 \frac{n_c^2 L^2}{4NA} \epsilon_m(t) \quad (7)$$

We expressly recognize in the above equation that $\theta_{EP}$ and $\epsilon_m$ are functions of time t, $\epsilon_m(t)$ being the maximum strain in the coil at time t.

A measure of the nonreciprocity expressed as the phase difference $\phi_{EP}(t)$ of light beams after propagating in reverse directions through the fiber-optic coil, the light beams initially having the same phase, is given by $$\phi_{EP}(t) = \frac{4kNA}{c} \frac{d\theta_{EP}(t)}{dt} \quad (8)$$

Substituting $\theta_{EP}(t)$ from equation (7), we obtain $$\phi_{EP}(t) \approx 0.16 \frac{kn_c^2 L^2}{c} \frac{d\epsilon_m(t)}{dt} \quad (9)$$

Although equations (6), (7), (8), and (9) above pertain to a particularly simple coil winding, the nonreciprocity principles remain the same for all coils. The nonreciprocity, as measured by the angular error $\theta_{EP}(t)$, is proportional to the maximum strain applied to the fiber-optic coil at time t. The nonreciprocity, as measured by the phase difference $\phi_{EP}(t)$, is proportional to the time derivative of the maximum strain. The best coils, regardless of the type of winding or faults in the winding, are characterized by the smallest measures of nonreciprocity. Thus, by setting appropriate limit values for either the nonreciprocity angular error or the nonreciprocity phase difference, one can screen fiber-optic coils as being either acceptable or unacceptable for incorporation in fiber-optic gyros.

The method for measuring nonreciprocity is illustrated in FIG. 1. The pressurizing unit 1 consists of an alignment jig 3 in which a fiber-optic coil 5 can be placed. The coil 5 is cushioned by elastomer layer 7.

The pressure plate 9 and the attached elastomer layer 11 make intimate contact with the top surface of the coil 5. The two elastomer layers 7 and 11 ensure that the coil 5 will not be damaged as a result of the application of pressure by the pressure plate 9. The rotatable bearing 13 is supported by shaft 15 in yoke 17 which in turn is attached to the pressure plate 9.

The support member 19 is attached to the alignment jig 3 by means of two or more pivoting clamps 21. The motor 23, with the cam 25 attached to the shaft 27 of the motor, is fastened to the support member 19. The alignment jig 3 is so designed as to provide proper alignment of the coil 5 and the pressure plate 9. The support member 19 and the clamps 21 are so designed as to result in the contact point between the cam 25 and the bearing 13 being on the line through motor shaft 27 and bearing shaft 15. The motor 23 can be an AC synchronous motor or a stepper motor.

The axial coil pressure is applied by the motor-driven cam 25 in an alternating fashion at any convenient and practical frequency. Approximately 100 pounds per square inch is needed to provide a reasonable fraction of the thermally-induced angular error obtained over the -50 C. to +70 temperature range. Alternating pressure at say 20 Hz, with phase sensitive detection referenced to the pressure frequency will permit measurements of fiber-optic coil non-reciprocities in approximately 1 minute since the phase sensitive detection greatly reduces the noise that would be present in static measurements The cam 25 can be shaped to provide any one of a variety of pressure functions of time including square-wave, trapezoidal-wave, triangular-wave, and sinusoidal-wave.

The preferred embodiment of the pressure-generating device utilizes the motion of a mechanical member, exemplified in FIG. 1 by the motor-driven cam, coupled in some fashion to the fiber-optic coil. Rather than using a rotating mechanical member, one might use the moving component of a linear stepper motor as the source of the force to be coupled to the fiber-optic coil.

The coupling of the mechanical member to the fiber-optic coil can also be accomplished in a variety of ways. The arrangement illustrated in FIG. 1 couples the moving mechanical member 25 to a pressure plate 9 which in turn is coupled to the fiber-optic coil through an elastic medium, elastomer layer 11. A single coil spring or a configuration of springs in an elastic configuration could be substituted for the elastomer layer 11. Although the elastic interface between the pressure plate and the fiber-optic coil could be eliminated leaving the pressure plate in intimate contact with the fiber-optic coil, such an approach is perhaps less desirable in that the motion of the mechanical member would have to be constrained to small movements. To accommodate small movements of the mechanical member, the construction tolerances of the pressurizing unit 1 would have to be substantially reduced.

Another approach to applying force to the pressure plate 9 is by means of a magnetic member attached to the pressure plate and positioned partially within a solenoid. The force exerted by the magnetic member on the pressure plate will be proportional to the magnetic field within the solenoid. Another possibility is to drive the pressure plate 9 with a piezoelectric device located between the pressure plate and the support member 19.

The electronics associated with the pressurizing unit 1 consists of a laser diode 35 which feeds a beam of coherent light through polarization controller 37, optical coupler 39, polarizer 41, and optical coupler 43 which splits the input beam into two output beams. One of the output beams is phase-modulated by phase modulator 45 and then traverses the fiber-optic coil 5 in a counter clockwise (CCW) direction. The other beam passes through the polarization controller 47 and then traverses the fiber-optic coil 5 in a clockwise (CW) direction. The CCW beam returns to the optical coupler 43 through the polarization controller 47, and the CW beam returns through the phase modulator 45. The CW and CCW beams are brought together into a combined a beam by the optical coupler 43, and the combined beam passes through the polarizer 41 and the optical coupler 39 to the light detector 49.

The output of the light detector 49 is given by $$I = A + B\cos[\alpha\cos\omega_m t - \alpha\cos\omega_m(t-\tau) + \phi_{EP}(t)] \tag{10}$$

where the first term within the brackets is the phase introduced by the phase modulator 45 on the CW beam and the second term within the brackets is the phase introduced by the phase modulator 45 on the CCW beam. This equation can be rewritten as $$I = A + B\cos\left[-2\alpha\sin\left(\omega_m t - \frac{1}{2}\omega_m\tau\right)\sin\left(\frac{1}{2}\omega_m\tau\right) + \phi_{EP}(t)\right] \tag{11}$$

If the product $\omega_m\tau$ of the phase modulation angular frequency and the light propagation time through the fiber-optic coil is equal to $\pi$, this equation simplifies to $$I = A + B\cos[2\alpha\cos(\omega_m t) + \phi_{EP}(t)] \tag{12}$$

Expanding the above equation in terms of Bessel functions and ignoring the terms involving harmonics of the phase-modulating angular frequency (which are eliminated by the phase detector 51), we obtain the equation $$I = A + B[J_0(2\alpha)\cos\phi_{EP} - 2J_1(2\alpha)\cos(\omega_M t)\sin\phi_{EP}(t)] \tag{13}$$

The above expression for I is multiplied by $\cos(\omega_m t)$ supplied by the control unit 55 and the product is integrated for a time long compared with the reciprocal of the phase-modulating angular frequency by the phase detector 51. Since $\phi_{EP}(t)$ is much smaller than 1, the result $\Phi_{51}(t)$ is given by $$\Phi_{51}(t) = K_\phi \phi_{EP}(t) \tag{14}$$

where $K_\phi$ is a constant.

The control unit 55 drives the motor 23 at a rate such that the maximum strain is a periodic function of time F(t) with period Tp:

$$\epsilon_m(t) = \epsilon_{m0} F(t) \tag{15}$$

where $\epsilon_{m0}$ is a constant. The function F(t) depends on the shape of the cam 23. Since the pressure-induced coil nonreciprocity $\phi_{51}(t)$ is proportional to the time derivative of the strain, $$\Phi_{51}(t) = \Phi_0 \frac{dF(t)}{dt} \tag{16}$$

where $\Phi_0$ is a constant proportional to $\epsilon_{m0}$.

The output $\Phi_{51}(t)$ of phase detector 51 is multiplied by a periodic function G(t) also with period Tp supplied by the control unit 55 and integrated at least over a time Tp and preferably, to suppress the noise associated with the measurement, over a time long compared to Tp by the phase detector 53. The result $\Phi_{53}$ is given by $$\Phi_{53} = \int \Phi_{51}(t) G(t) dt \tag{17}$$

To maximize the signal component, the function G(t) should be identical to dF(t)/dt. For acceptable performance, G(t) should be chosen such that $$\int G^2(t) dt = \int \left[\frac{dF(t)}{dt}\right]^2 dt \tag{18}$$

and $$\left| \int G(t) \frac{dF(t)}{dt} dt \right| > \left(\frac{1}{S/N}\right) \int \left[\frac{dF(t)}{dt}\right]^2 dt \tag{19}$$

for the integration time of phase detector 53. The signal-to-noise ratio SIN is that associated with the G(t) that maximizes the signal-to-noise ratio.

The output $\Phi_{53}$ of the phase detector 53 is a quantity proportional to $\Phi_0$ and thus constitutes a measure of the pressure-induced nonreciprocity of the fiber-optic coil 5. The output of the coil 5 is supplied to the control unit 55 which compares it with a screening level and indicates whether the fiber-optic coil is acceptable or nonacceptable.

There are a variety of choices for F(t) and G(t). The function F(t) can be a square wave which results in the output $\Phi_{51}(t)$ of phase detector 51 being a sequence of impulses coinciding with the zero crossings of the square wave and alternating in sign. The function G(t) can be any function for which the positive values of G(t) generally coincide with the positive impulses of $\Phi_{51}(t)$ and the negative values generally coincide with the negative impulses. To maximize the signal-to-noise ratio of the output of phase detector 53, G(t) should approximate the time derivative of F(t), a sequence of impulses of alternating sign.

The function F(t) can be a trapezoidal wave which results in the output $\Phi_{51}(t)$ of phase detector 51 being a sequence of pulses coinciding with the varying portions of the trapezoidal wave and alternating in sign. Again, the function G(t) can be any function for which the positive values of G(t) generally coincide with the positive pulses of $\Phi_{51}(t)$ and the negative values generally coincide with the negative pulses. Again, to maximize the signal-to-noise ratio of the output of phase detector 53, G(t) should approximate the time derivative of F(t), a sequence of pulses of alternating sign.

The function F(t) can be a triangular wave which results in the output $\Phi_{51}(t)$ of phase detector 51 being a square wave with zero crossings coinciding with the positive and negative peaks of the triangular wave. Again, the function G(t) can be any function for which the positive values of G(t) generally coincide with the positive portions of $\Phi_{51}(t)$ and the negative values generally coincide with the negative portions. Again, to maximize the signal-to-noise ratio of the output of phase detector 53, G(t) should approximate the time derivative of F(t), a square wave.

The function F(t) can be a sine wave which results in the output $\Phi_{51}(t)$ of phase detector 51 being a cosine wave. Again, the function G(t) can be any function for which the positive values of G(t) generally coincide with the positive portions of $\Phi_{51}(t)$ and the negative values coincide with the negative portions. Again, to maximize the signal-to-noise of the output of phase detector 53, G(t) should approximate the time derivative of F(t), a cosine wave.

If phase detector 51 includes an integrator just prior to its output, the output becomes $\Theta_{51}(t)$, the integral of $\Phi_{51}(t)$, where $\Theta_{51}(t)$ is given by $$\Theta_{51}(t) = K_\theta \theta_{EP}(t) \tag{20}$$

where $K_\theta$ is a constant. With this approach, the nonreciprocity measure is based on the angular error of the fiber-optic gyro that utilizes the fiber-optic coil.

The control unit 55 drives the motor 23 at a rate such that the maximum strain is a periodic function of time F(t) with period Tp:

$$\epsilon_m(t) = \epsilon_{m0} F(t) \tag{21}$$

where $\epsilon_{m0}$ is a constant. The function F(t) depends on the shape of the cam 23. Since the pressure-induced coil nonreciprocity $\Theta_{51}(t)$ is proportional to the strain, $$\Theta_{51}(t)=\Theta_0 F(t) \quad (22)$$

where $\Theta_0$ is a constant proportional to $\epsilon_{m0}$.

The output $\Theta_{51}(t)$ of phase detector 51 (with integrator) is multiplied by a periodic function G(t) also with period Tp supplied by the control unit 55 and integrated at least over a time Tp and preferably, to suppress the noise associated with the measurement, over a time long compared to Tp by the phase detector 53. The result $\Theta_{53}$ is given by $$\Theta_{53}=\int \Theta_{51}(t)G(t)dt \quad (23)$$

To maximize the signal component of $\Theta_{53}$, the function G(t) should be identical to F(t). For acceptable performance, G(t) should be chosen such that $$\int G^2(t)dt = \int F^2(t)dt \quad (24)$$

and $$|\int G(t)F(t)dt| > \left(\frac{1}{S/N}\right)\int F^2(t)dt \quad (25)$$

for the integration time of phase detector 53. The signal-to-noise ratio S/N is that associated with the G(t) that maximizes the signal-to-noise ratio.

The output $\Theta_{53}$ of the phase detector 53 is a quantity proportional to $\Theta_0$ and thus constitutes a measure of the pressure-induced nonreciprocity of the fiber-optic coil 5. The output of the coil 5 is supplied to the control unit 55 which compares it with a screening level and indicates whether the fiber-optic coil is acceptable or nonacceptable.

There are a variety of choices for F(t) and G(t). The function F(t) can be a square wave which results in the output $\Theta_{51}(t)$ of phase detector 51 being a square wave. The function G(t) can be any function for which the positive values of G(t) generally coincide with the positive values of $\Theta_{51}(t)$ and the negative values of G(t) generally coincide with the negative values of $\Theta_{51}(t)$. To maximize the signal component of the output of phase detector 53, G(t) should be a replica of F(t).

The function F(t) can be a trapezoidal wave which results in the output $\Theta_{51}(t)$ of phase detector 51 being a trapezoidal wave. Again, the function G(t) can be any function for which the positive values of G(t) generally coincide with the positive values of $\Theta_{51}(t)$ and the negative values of G(t) generally coincide with the negative values of $\Theta_{51}(t)$. Again, to maximize the signal component of the output of phase detector 53, G(t) should be a replica of F(t).

The function F(t) can be a triangular wave which results in the output $\Theta_{51}(t)$ of phase detector 51 being a triangular wave. Again, the function G(t) can be any function for which the positive values of G(t) generally coincide with the positive values of $\Theta_{51}(t)$ and the negative values of G(t) generally coincide with the negative values of $\Theta_{51}(t)$ values. Again, to maximize the signal component of the output of phase detector 53, G(t) should be a replica of F(t).

The function F(t) can be a sine wave which results in the output $\Theta_{51}(t)$ of phase detector 51 also being a sine wave. Again, the function G(t) can be any function for which the positive values of G(t) generally coincide with the positive values of $\Theta_{51}(t)$ and the negative values of G(t) generally coincide with the negative values of $\Theta_{51}(t)$. Again, to maximize the signal component of the output of phase detector 53, G(t) should be a replica of of F(t).

What is claimed is:

1. A method for quantitatively characterizing the pressure-induced nonreciprocity of a fiber-optic coil, the pressure-induced nonreciprocity being a property of a fiber-optic coil which pertains to the degree to which light beams, initially in phase, differ in phase as a result of traversing the fiber-optic coil in reverse directions while the fiber-optic coil is being subjected to a time-varying pressure, the method comprising the steps:
   applying time-varying pressure to the fiber-optic coil for a predetermined time period;
   measuring the phase difference of light beams traversing the fiber-optic coil in reverse directions during the predetermined time period;
   obtaining a measure of the nonreciprocity of the fiber-optic coil utilizing the measured phase difference.

2. The method of claim 1 wherein the time-varying pressure is specified by a first function of time, the measure of the nonreciprocity being the integral over the predetermined time period of the product of a second function of time and either (1) the phase difference of light beams traversing the fiber-optic coil in reverse directions during the predetermined time period or (2) the integral over time of the phase difference.

3. The method of claim 2 wherein the second function is chosen such that the measure of the nonreciprocity has a signal-to-noise ratio of at least one.

4. The method of claim 2 wherein the second function is (1) an approximation of the time derivative of the first function if the product involves the phase difference or (2) an approximation of the first function if the product involves the integral of the phase difference.

5. The method of claim 2 wherein the first function is a square wave.

6. The method of claim 2 wherein the first function is a trapezoidal wave.

7. The method of claim 2 wherein the first function is a triangular wave.

8. The method of claim 2 wherein the first function is a sinusoidal wave.

9. Apparatus for practicing the method of claim 1.

10. The apparatus of claim 9 wherein the pressure applied to the fiber-optic coil results from the motion of a mechanical member coupled to the surface of the fiber-optic coil.

11. The apparatus of claim 10 wherein the mechanical member is coupled to the fiber-optic coil through one or more springs and a pressure plate, the pressure plate being in intimate contact with the fiber-optic coil.

12. The apparatus of claim 10 wherein the mechanical member is coupled to the fiber-optic coil through a pressure plate and an elastic layer, the elastic layer being in intimate contact with the fiber-optic coil.

13. The apparatus of claim 10 wherein the mechanical member is coupled to the fiber-optic coil through an elastic layer and a pressure plate, the pressure plate being in intimate contact with the fiber-optic coil.

14. The apparatus of claim 10 wherein the mechanical member is coupled to the fiber-optic coil through a pressure plate, the pressure plate being in intimate contact with the fiber-optic coil.

15. The apparatus of claim 9 wherein the pressure applied to the fiber-optic coil results from an electric field applied to a piezoelectric device coupled to the fiber-optic coil.

16. The apparatus of claim 9 wherein the pressure applied to the fiber-optic coil results from a magnetic member in a magnetic field, the magnetic member being coupled to the fiber-optic coil.

* * * * *